United States Patent
Sabat, Jr.

(10) Patent No.: US 6,480,702 B1
(45) Date of Patent: Nov. 12, 2002

(54) APPARATUS AND METHOD FOR DISTRIBUTING WIRELESS COMMUNICATIONS SIGNALS TO REMOTE CELLULAR ANTENNAS

(75) Inventor: John Sabat, Jr., Merrimack, NH (US)

(73) Assignee: Transcept, Inc., Manchester, NH (US)

( * ) Notice: Subject to any disclaimer, the term of this patent is extended or adjusted under 35 U.S.C. 154(b) by 0 days.

(21) Appl. No.: 08/695,175

(22) Filed: Aug. 1, 1996

(51) Int. Cl.$^7$ ................................................ H04B 1/00
(52) U.S. Cl. .................... 455/115; 455/126; 330/149
(58) Field of Search ............................... 455/422, 426, 455/522, 561, 562, 575, 91, 114, 115, 116, 126, 69, 70, 4.1, 6.03, 20; 330/129, 149

(56) References Cited

U.S. PATENT DOCUMENTS

| | | | | |
|---|---|---|---|---|
| 4,392,245 A | * | 7/1983 | Mitama ........................ 455/69 |
| 5,124,665 A | * | 6/1992 | McGann ...................... 455/126 |
| 5,129,098 A | * | 7/1992 | McGirr et al. ............... 455/126 |
| 5,193,223 A | * | 3/1993 | Walczak et al. ............. 455/126 |
| 5,381,459 A | * | 1/1995 | Lappington ................. 455/426 |
| 5,452,473 A | * | 9/1995 | Weiland et al. ............. 455/126 |
| 5,809,395 A | * | 9/1998 | Hamilton-Piercy et al. ...... 455/6.03 |

* cited by examiner

Primary Examiner—Thanh Cong Le
(74) Attorney, Agent, or Firm—Kirkpatrick & Lockhart LLP

(57) ABSTRACT

An apparatus and method for transmitting telecommunications signals from a wired system to mobile receivers, includes a signal hub for receiving a telecommunications transmission signal for distribution to a mobile receiver and including first elements for measuring a power level of the received transmission signal, a multiplicity of distributed remote antenna drivers, each having a respective antenna, a controllable amplifier adapted to couple transmission signals to the antenna and second elements for measuring a signal power level of a transmission signal at the antenna, a network for coupling the transmission signal from the signal hub to one or more remote antenna drivers, and elements for determining a gain factor for each respective amplifier and thereby the transmission signal at each respective antenna in response to the measured received signal power level and the respective measured antenna signal power level.

14 Claims, 4 Drawing Sheets

APPARATUS AND METHOD FOR DISTRIBUTING WIRELESS COMMUNICATIONS SIGNALS TO REMOTE CELLULAR ANTENNAS

BACKGROUND OF THE INVENTION

1. Field of the Invention

The present invention generally relates to cellular wireless communications, and particularly to networks used for coupling communications signals between cellular transceivers and land line interconnection points.

2. Statement of the Prior Art

The wireless communications area of Personal Communications Services, PCS, is under development as of the filing date hereof and employs digital pulse transmission signals in one or more of its accepted formats. PCS is similar to cellular telephone networks in the use of multiple transmission cells for the wireless connection between portable transceivers and the network. There is a general need in cellular wireless communications systems to increase the call handling capacity of the networks to accommodate more callers, higher peak usage and higher data capacity. The latter goal is particularly useful to PCS, which includes more data related services than the commonly used analog cellular telephones.

A well known approach for increasing calling capacity of a cellular system is to decrease the size and range of each cell and increase the number of cells or stationary transceivers. This allows for greater reuse of the limited number of frequency channels allocated for wireless communications, because the cells or base stations are smaller and transmit with less power. Thus, another cell, located at a closer range, can reuse the same channels for additional calls without interference. The primary disadvantage in using smaller cells is the increased installation, operating and maintenance costs of the greater number of base stations.

A suggestion has been made in U.S. Pat. No. 5,381,459, to use existing cable television networks to distribute wireless communications signals between a telephone network coupling and remote transmitter receiver sites or cells. This approach couples transmission and reception signals over the coaxial cable television network in a time and frequency multiplexed manner. Such time multiplexing requires transcription of these signals at the remote transceiver sites into and from their transmission format. This increases the complexity of the remote transceivers and their associated control electronics. This, in turn, impacts the system cost of using a greater number of smaller cells.

Coaxial cable television networks suffer the additional disadvantage of substantial variation of the distribution links within even a single network, resulting in varying gain and amplification considerations. This variability in signal loss is compounded by being temperature dependent, which places an additional time variation factor on each system link. Thus, controlling transmission power level can be difficult and even critical given the desire to both provide reliable data transmission and limit the area of cell coverage to enhance frequency reuse, This further increases the cost of the numerous remote transceivers.

One format which has been applied to PCS is code division multiple access, CDMA. This method multiplexes signals over the same bandwidth and time frame by providing each call with a unique frequency coded pattern for transmitting its data. Mobile receivers, capable of deciphering the various codes, are used to separate their particular signal of interest from the various transmitted signals. The CDMA nature of the transmission signals limits the time multiplexing and frequency multiplexing techniques which may be used to distribute the signals over a coaxial cable television network to remote transceivers without the use of extensive signal format transcription electronics at the transceivers.

SUMMARY OF THE INVENTION

Accordingly, it is an object of the present invention to provide a system for coupling PCS signals over a coaxial cable television network between a telephone network interface and remote cell sites.

It is a further object of the present invention to provide such a system having adequate signal power level control to enable optimum control of transmission signal power levels at the remote antennas.

It is a still further object of the present invention to provide such a system which minimizes the size and complexity of the transceivers associated with each remote cell sites.

It is yet a further object of the present invention to provide such a system which distributes PCS signals in a CDMA format.

In one form, the present invention provides a system for transmitting telecommunications signals from a wired system to mobile receivers, comprising a signal hub means for receiving a telecommunications transmission signal for distribution to a mobile receiver and including first means for measuring a power level of the received transmission signal, a multiplicity of distributed remote antenna drivers, each having a respective antenna, a controllable amplifier adapted to couple transmission signals to the antenna and second means for measuring a signal power level of a transmission signal at the antenna, network means for coupling the transmission signal from the signal hub means to one or more remote antenna drivers, and means for determining a gain factor for each respective amplifier and thereby the transmission signal at each respective antenna in response to the measured received signal power level and the respective measured antenna signal power level.

In another form, the present invention resides in a telecommunications system having at least one signal hub coupled via a coaxial wire network to a multiplicity of distributed remote antenna drivers with each driver having a respective antenna and a controllable amplifier adapted to couple transmission signals to the antenna, in a method for controlling signal gain of the transmission signal at the remote antenna drivers, comprising receiving, at the signal hub, a telecommunications transmission signal for distribution over the network to at least one remote antenna driver, measuring a power level of the received transmission signal at the signal hub, distributing the received transmission signal driver over the network to a remote antenna and its respective amplifier and antenna, measuring an antenna signal power level of the transmission signal at the respective antenna, and determining a gain factor for the respective amplifier and thereby of the transmission signal at the respective antenna driver in response to the measured received signal power level and the measured power level of the signal at the antenna.

BRIEF DESCRIPTION OF THE DRAWINGS

The present invention is illustratively described in reference to the appended drawings in which.

DETAILED DESCRIPTION OF THE DRAWINGS

Figure 1:
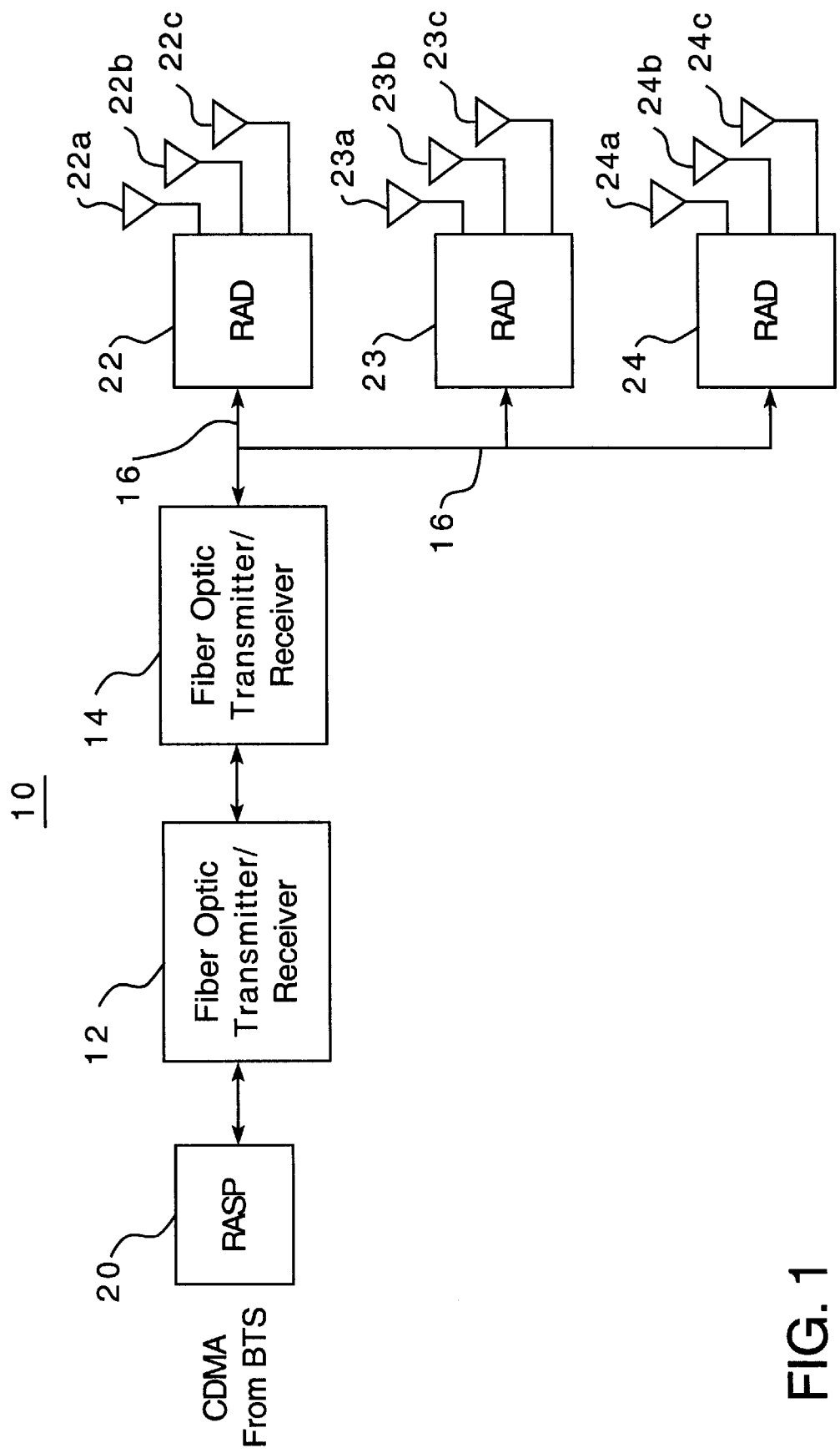
FIG. 1 is a block diagram of a portion of a cable television distribution system combined with a PCS signal distribution network constructed in accordance with one embodiment of the present invention.

FIG. 1 shows a PCS signal distribution network 10 which includes components of a 10 cable television, CATV, network. The CATV network components include a pair of fiber optic transmitter/receivers 12,14 and a coaxial cable, transmission line 16. These CATV components would be used to carry and distribute CATV signals as well as PCS signals, but the remainder of the CATV system is somewhat irrelevant to the present embodiment and, thus, is not shown. The PCS signal distribution components include a remote antenna signal processor, RASP, 20 and a multiplicity of remote antenna drivers, RADs, 22–24. Each RAD 22–24 includes a respective multiplicity of co-located antennas 22a–22c,23a–23c,24a–24c.

In the downstream or transmit operation, RASP 20 acts as both a signal hub for the distribution of communications signals as well as a source of control signals for each RAD 22–24. These signals are frequency multiplexed with normal CATV signals, in the same manner as multiple TV channels, and distributed via the CATV components 14–16. Each PCS signal and a respective control signal are separated by their respective RAD 22–24 and divided into the control component for use within the RAD 22–24 and the PCS signal to be frequency converted and transmitted through a single transmit antenna 22a,23a,24a.

In the upstream or receive operation, each RAD 22–24 receives signals via a primary antenna 22b,23b,24b and a diversity antenna 22c,23c,24c. These primary and diversity signals are sent over the CATV components 14–16 back to RASP 20 along with certain control data signals.

The CATV components 14–16 are nominally described and will vary greatly depending upon the specific network and the nature of the remote locations. For example, the fiber optic transmission system may not be used and an extended coaxial system may take its place. Regardless of the nature of the CATV system and components, RASP 20 and RAD 22 provide PCS signals and control signals which are compatible with CATV signals in bandwidth and amplitude. These PCS signals may be frequency multiplexed over a single transmission line of a CATV system along with and in the same manner as ordinary TV signals. Thus, the precise nature of the CATV distribution components is irrelevant to the operation of the current embodiment of the invention. The only consideration is that the CATV network be adapted to transmit signals bi-directionally as the most modern systems are.

In any event, the variations of possible CATV network configurations also cause great variations in the network signal losses, and therefore, the required amplification within the network. Thus, the combined CATV/PCS signal may be reamplified any number of times in order to maintain it within acceptable limits for transmission over the CATV network.

Figure 2:
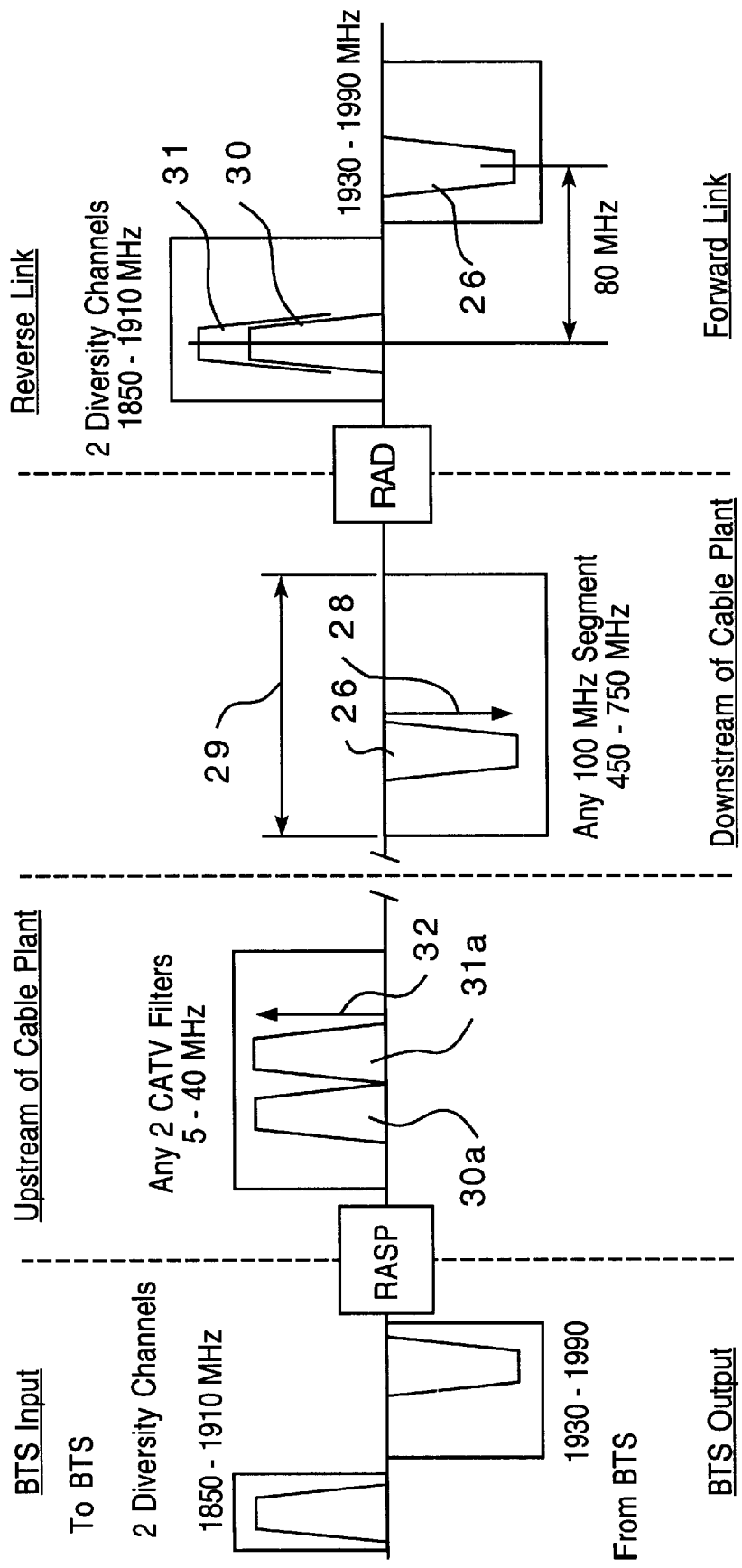
FIG. 2 is a representative signal diagram of certain signals used in the embodiment of FIG. 1.

FIG. 2 is a signal diagram of the signals transmitted between RASP 20 and each RAD 22–24. On the downstream side a PCS transmission signal 26 is shown frequency multiplexed with a control signal 28. This pair of signals 26,28 occupies a 100 Mhz. bandwidth 29 with a CATV transmission scheme. A separate pair of signals 26,28 is generated by RASP 20 for each separate RAD 22–24 connected thereto. Each separate pair of signals 26,28 is frequency translated to a separate bandwidth which is dedicated to a single RAD. The intended recipient RAD monitors its dedicated frequency bandwidth and separates its respective pair of signals 26,28.

On the upstream side, each RAD receives a primary and diversity signal 30,31 which it processes and frequency multiplexes for upstream transmission over the CATV components. In one embodiment, the primary signals received at all of the RADs are 25 frequency translated to the same frequency bandwidth and coupled to the same CATV transmission line to form a single primary signal 30a. The diversity signals are similarly frequency translated to a separate single bandwidth and coupled to the CATV transmission line 16 to form a single diversity signal 31a. Control signals 32 from each of the RADs are also frequency multiplexed adjacent to the signals 30a,31a within a bandwidth 33, which is also within the CATV transmission scheme. Control signals 32 from separate RADs are also time multiplexed on a polled basis so that only one RAD at a time is sending control data to RASP 20. This polling is performed through use of the downstream control data signal 28.

Figure 3:
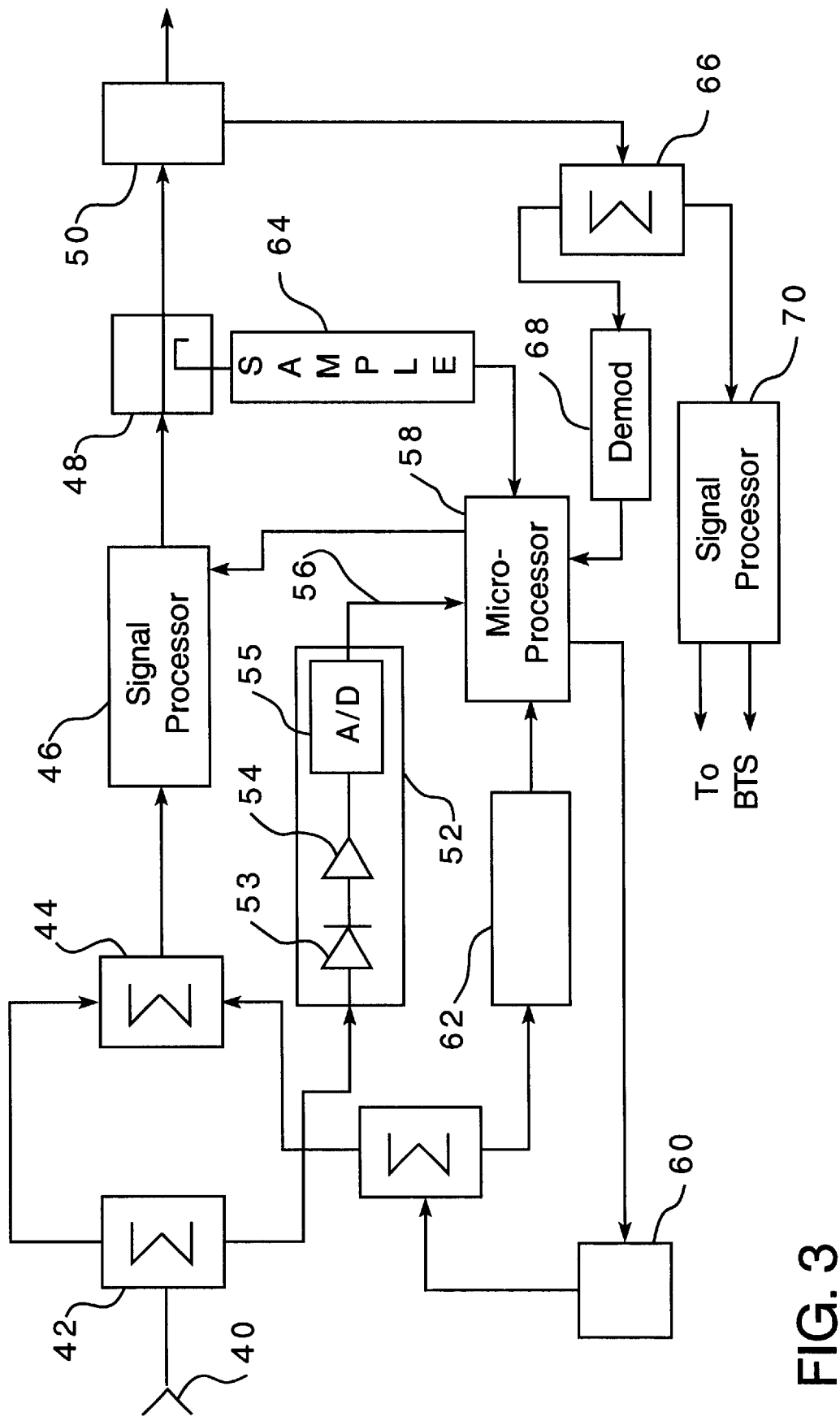
FIG. 3 is a circuit diagram of a portion of the embodiment of FIG. 1.

FIG. 3 is a circuit diagram of the basic functions of RASP 20. An input 40 receives a PCS transmission signal 26 of FIG. 2 from a Base Transmission Station, BTS, connected to the local telephone system. A small portion of this signal is taken for power measurement by splitter/summer 42, and most of the transmission signal is coupled to splitter/summer 44 for combination with a control data signal 28 of FIG. 2. The combined signal is r.f. signal processed for transmission over the CATV components by r.f. signal processor 46. This processing conditions the r.f signal for transmission over the CATV network using well known techniques and devices, which are not critical to the present invention. The transmission signal 26 and its combined control data signal 28 are frequency translated into a proper frequency slot for the CATV system being used for distribution. The signal power is sampled by a tap 48 just prior to a network coupler 50.

As mentioned, a portion of the received transmission signal power is measured by a sampling circuit 52, which includes a detector 53, an operational amplifier 54 and an analog to digital, A/D, converter 55. Sampling circuit 52 outputs a digital sampling 56 of the envelope of transmission signal 26, which is then coupled to a microprocessor 58. Microprocessor 58 integrates digital sampling 56 over time to determine an average power measurement for the received transmission signal 26.

As mentioned a portion of the output power of signal processor 46 is taken by tap 48 for measurement. This taped power is measured by a sampling circuit 64 which is similar to sampling circuit 52.

Microprocessor 58 also produces control data which is included in control data signal 28. This control data is passed through signal processor 60 to create control data signal 28, which is compatible with transmission signal 26. A portion of control data signal 28 is coupled off for measurement by a sampling circuit 62 which is identical to circuit 52, and the sampling is similarly provided to the microprocessor 58. This allows control of the power level of control data signal 28 by microprocessor 58. Most of the control data signal power is coupled to signal splitter/summer 44 for combination with transmission signal 26.

The upstream or received signal from the CATV network is handled by the remainder of the circuit shown in FIG. 3, which basically uses a signal splitter/summer 66 to couple the received signal to both a demodulator 68 and a signal processor 70. Signal processor 70 separates the upstream communication signals 30a,31a of FIG. 2, and conditions it for coupling to the BTS for communication purposes. Demodulator 68, separates the control data signal 32 from the upstream signal and couples the data thereof to the microprocessor 58.

Figure 4:
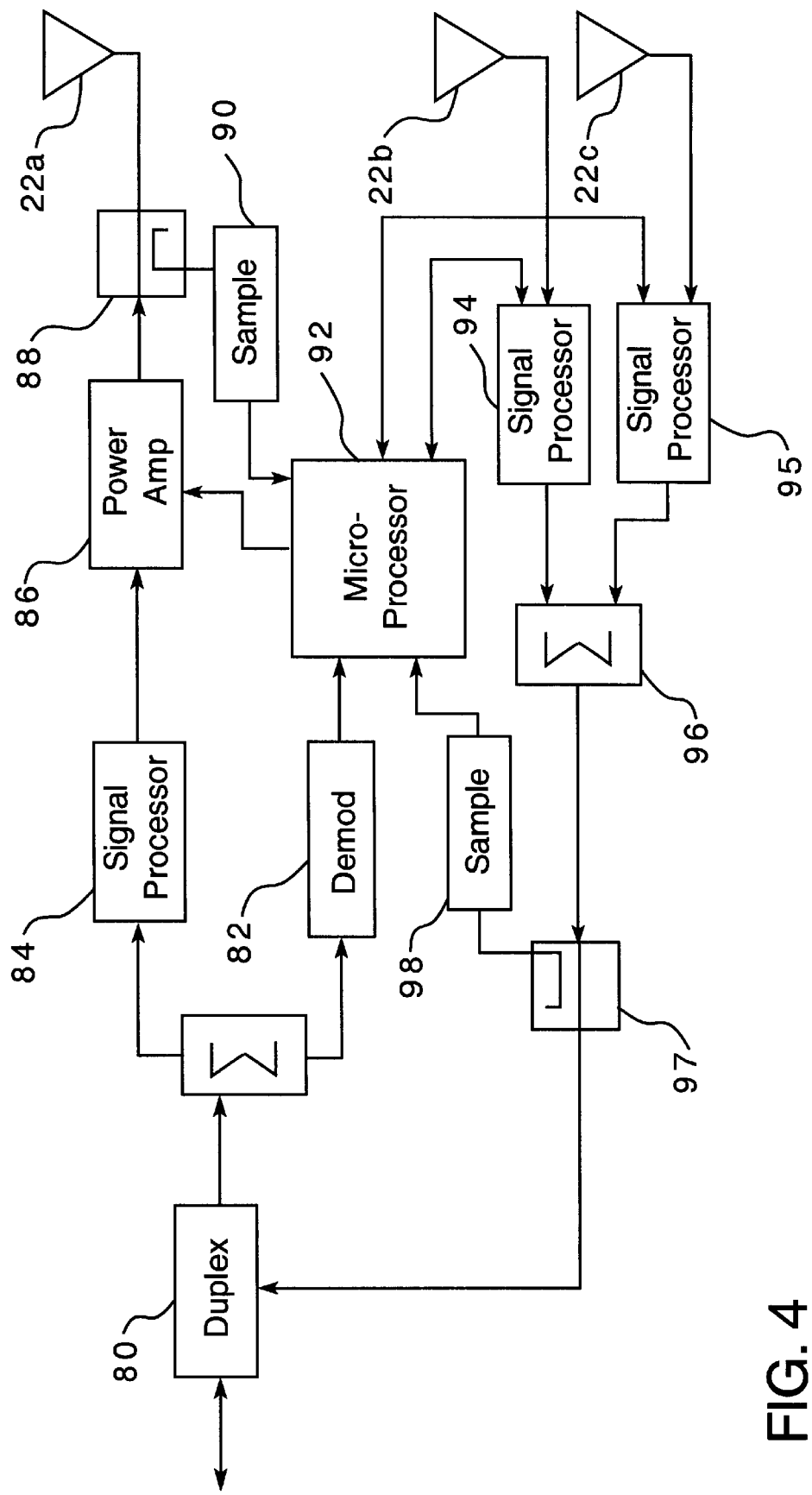
FIG. 4 is a circuit diagram of another portion of the embodiment of FIG. 1.

FIG. 4 is a circuit diagram of a typical RAD 22, wherein a coupler 80 handles duplex signals to and from the CATV distribution links 16 of FIG. 1. The incoming signals from RASP 20 are split between a demodulator 82 for the control data signal 28 and a signal processor 84 for the transmission signal 26. Signal processor 84 frequency translates transmission signal 26 from the CATV network modulation frequency to the proper frequency band for wireless transmission using well known processing techniques. The output of processor 84 passes through a controllable power amplifier 86 on its way to antenna 22a, and a small portion of the transmission power is coupled off by tap 88 just prior to antenna 22a. A sampling circuit 90, similar to sampling circuit 52, measures this tapped power and couples the measurement to a microprocessor 92.

Microprocessor 92 also receives the demodulated control data signal 26 and is coupled to power amplifier 86 to control the operation thereof. Based upon the received control data of signal 28, microprocessor 92 can determine the gain factor of amplifier 86 and thereby the transmission signal power at antenna 22a.

Wireless communications signals are also received by RAD 22 through its receive antennas 22b,22c. These received signals go through signal processors 94,95 under the control of microprocessor 92 and have added thereto a control data signal 32. Signal processors 94,95 translate the received primary and diversity signals from wireless transmission frequencies to CATV network transmission frequencies and further separate the primary and diversity signals in frequency so that they may be differentiated by RASP 20. These separated signals may then be summed in splitter/summer 96 for coupling over the CATV network. A portion of the combined signal is taken by tap 97 and sampled by sampling circuit 98 for use by microprocessor 92. This allows control of the power level transmitted over CATV network by microprocessor 92 through signal processors 94,95.

Microprocessor 92 also generates control data signal 32 which it combines with the received wireless transmission signals through control lines 92a,92b, whenever microprocessor 92 is polled for such data by RAD 22.

In the operation of the overall system 10, RASP 20 acts as a signal hub for receiving telecommunications transmissions signals through the input 40 of FIG. 3, for distribution to mobile receivers. This signal hub includes the sampler 52 and a portion of the software of microprocessor 58 for measuring the power level of the received signal. This signal hub further includes signal processor 46 for frequency translating the communications signal to an appropriate frequency bandwidth for the particular CATV components 12–16. The translated signal 26 is then coupled to the CATV components, or at least the coaxial distribution link 16 along with a control signal 28 which requests that the RAD 22 for which the signal is intended, report back to the RASP 20 with the antenna power level of the transmission signal. All such control signals are generated by microprocessor 58 and frequency translated by signal processor 46 with their respective communications signals.

RAD 22 constantly filters all signals within a predetermined frequency band dedicated to that RAD, and further separates transmission signals 26 and control signals 28. Transmission signals are signal processed and frequency translated into the intended PCS transmission bandwidth, amplified and transmitted through antenna 22a. Just prior to antenna 22a a power sample is taken and coupled to microprocessor 92. Meanwhile control signal 28 has been demodulated and coupled to microprocessor 92, which receives the command to report the antenna power level.

Microprocessor 92 averages the power sample levels from the sampling circuit 90 over a sufficient period of time to insure sufficient overlap of the time domain of the power measurement with the measurement taken at RASP 20 of the input power. Microprocessor 92 then reports this average power measurement back to RASP 20 by mixing the data with the received transmission signals of either primary antenna 22b or secondary antenna 22c. The mixing is performed in a frequency multiplexed manner. The primary signals otherwise received by antennas 22b, 22c are otherwise signal processed with frequency translation to different but adjacent frequency bands of the CATV frequency spectrum. This allows the primary and secondary signals to be differentiated by RASP 20. These signals may then be summed for coupling over the CATV network.

RASP 20 receives the incoming transmission signals along with the frequency multiplexed control data signal 32 which contains the power measurement reading. This power reading is compared with the power level of the received transmission signal by the microprocessor 58, which then determines a gain adjustment for the power amplifier 86 of RAD 22. This power adjustment is then incorporated into the outgoing control data signal 28 intended for RAD 22. RAD 22 receives the power adjustment signal and adjusts the gain of amplifier 86 accordingly. In one implementation, the power adjustment is determined to create a fixed system gain between the input transmission signal and the antenna transmission signal.

CONCLUSION

The embodiments described above are intended to be taken in an illustrative and not a limiting sense. Various modifications and changes may be made to the above embodiments by persons skilled in the art without departing from the scope of the present invention as defined in the appended claims.

For example, the antenna transmission power level does not have to be reported back to RASP 20 for determination of a gain adjustment. Instead, RASP 20 may measure the transmission signal input power and instruct the RAD 22 as to what the antenna power level should be. RAD 22 could then compare the measured antenna power level against the intended power level and adjust its own amplifier accordingly.

What is claimed is:

1. A remote antenna signal processor, comprising:
    a signal processor for processing a telecommunications transmission signal and a first control signal for transmission over a network to a remote antenna driver, wherein the first control signal is for use by the remote antenna driver to control a gain factor of the remote antenna driver;

a first sample circuit for measuring a power level of the telecommunications transmission signal prior to processing by the signal processor;

a demodulator for separating a second control signal from a signal received over the network from the remote antenna driver, wherein the second control signal is indicative a power level of the telecommunications transmission signal at a transmit antenna of the remote antenna driver;

a microprocessor for generating the first control signal based on an output signal from the first sample circuit and an output signal from the demodulator; and a second sample circuit for measuring a power level of the first control signal prior to processing by the signal processor, and wherein the microprocessor is for additionally generating the first control signal based on an output signal from the second sample circuit.

2. The remote antenna signal processor of claim 1, wherein the first sample circuit includes:

a detector having an input terminal and an output terminal, wherein the input terminal is for receiving the telecommunications transmission signal;

an operational amplifier having an input terminal and an output terminal, wherein the input terminal is coupled to the output terminal of the detector; and an A/D converter having an input terminal coupled to the output terminal of the operational amplifier and having an output terminal coupled to an input terminal of the microprocessor.

3. The remote antenna signal processor of claim 1, further comprising a summer for combining the telecommunications transmission signal and the first control signal prior to processing by the signal processor.

4. The remote antenna signal processor of claim 1, further comprising a third sample circuit for measuring a power level of the telecommunications transmission signal after processing by the signal processor, wherein an output terminal of the third sample circuit is coupled to an input terminal of the microprocessor.

5. A remote antenna signal processor, comprising:

a summer having a first input terminal for receiving a telecommunications transmission signal and a second input terminal for receiving a first control signal, wherein the telecommunications transmission signal and the first control signal are for transmission over a network to a remote antenna driver, and wherein the first control signal is for use by the remote antenna driver to control a gain factor of the remote antenna driver;

a first signal processor having an input terminal and an output terminal, wherein the input terminal is coupled to an output terminal of the summer;

a coupler having an input terminal coupled to the output terminal of the first signal processor and having an output terminal for coupling to the network;

a first sample circuit having an input terminal and an output terminal, wherein the input terminal is for receiving the telecommunications transmission signal;

a demodulator for separating a second control signal from a signal received over the network from the remote antenna driver, wherein the second control signal is indicative a power level of the telecommunications transmission signal at a transmit antenna of the remote antenna driver, wherein the demodulator includes an input terminal coupled to the network; and a microprocessor having a first input terminal coupled to the output terminal of the first sample circuit, a second input terminal coupled to an output terminal of the demodulator, and an output terminal coupled to the second input terminal of the summer.

6. The remote antenna signal processor of claim 5, further comprising a first splitter having an input terminal for receiving the telecommunications transmission signal, a first output terminal coupled to the first input terminal of the summer, and a second output terminal coupled to the input terminal of the first sample circuit.

7. The remote antenna signal processor of claim 6, wherein the first sample circuit includes:

a detector having an input terminal and an output terminal, wherein the input terminal is coupled to the second output terminal of the splitter;

an operational amplifier having an input terminal and an output terminal, wherein the input terminal is coupled to the output terminal of the detector; and an A/D converter having an input terminal coupled to the output terminal of the operational amplifier and having an output terminal coupled to an input terminal of the microprocessor.

8. The remote antenna signal processor of claim 5, further comprising a second sample circuit having an input terminal coupled to the output terminal of the microprocessor and having an output terminal coupled to a third input terminal of the microprocessor.

9. The remote antenna signal processor of claim 8, further comprising a second splitter having an input terminal coupled to the output terminal of the microprocessor, a first output terminal coupled to the second input terminal of the summer, and a second output terminal coupled to the input terminal of the second sample circuit.

10. The remote antenna signal processor of claim 9, further comprising a second signal processor having an input terminal coupled to the output terminal of the microprocessor and having an output terminal coupled to the input terminal of the second splitter.

11. The remote antenna signal processor of claim 10, further comprising a third sample circuit having an input terminal coupled to the output terminal of the first signal processor and having an output terminal coupled to a first input terminal of the microprocessor.

12. A telecommunications system, comprising:

a remote antenna signal processor; and at least one remote antenna driver in communication with the remote antenna signal processor via a network, wherein the remote antenna signal processor includes:

a first signal processor for processing a telecommunications transmission signal and a first control signal for transmission over the network to the remote antenna driver;

a first sample circuit for measuring a power level of the telecommunications transmission signal prior to processing by the first signal processor;

a demodulator for separating a second control signal from a signal received from the remote antenna driver over the network, wherein the second control signal is indicative a power level of the telecommunications transmission signal at a transmit antenna of the remote antenna driver; and a first microprocessor for generating the first control signal based on an output signal from the first sample circuit and an output signal from the demodulator;

and wherein the remote antenna driver includes:

a splitter having an input terminal for receiving the telecommunications transmission signal and the first control signal from the remote antenna driver over the network;

a second signal processor having an input terminal coupled to a first output terminal of the splitter;

a demodulator having an input terminal coupled to a second output terminal of the splitter;

a power amplifier having an input terminal coupled to the output terminal of the second signal processor;

a transmit antenna coupled to an output terminal of the power amplifier; and a second microprocessor having an input terminal coupled to an output terminal of the demodulator and having an output terminal coupled to a control terminal of the power amplifier.

13. The system of claim 12, wherein the network includes a CATV network.

14. The system of claim 12, wherein the network includes coaxial wire.

* * * * *